(12) United States Patent
Kinoshita

(10) Patent No.: US 9,055,228 B2
(45) Date of Patent: Jun. 9, 2015

(54) IMAGING DEVICE AND SIGNAL PROCESSING METHOD FOR FLICKER REDUCTION

(75) Inventor: Masaya Kinoshita, Kanagawa (JP)

(73) Assignee: Sony Corporation, Tokyo (JP)

( * ) Notice: Subject to any disclaimer, the term of this patent is extended or adjusted under 35 U.S.C. 154(b) by 2679 days.

(21) Appl. No.: 11/547,973

(22) PCT Filed: Jun. 1, 2005

(86) PCT No.: PCT/JP2005/010442
§ 371 (c)(1),
(2), (4) Date: Jul. 28, 2008

(87) PCT Pub. No.: WO2005/120047
PCT Pub. Date: Dec. 15, 2005

(65) Prior Publication Data
US 2008/0303920 A1    Dec. 11, 2008

(30) Foreign Application Priority Data
Jun. 1, 2004  (JP) ................................ P2004-163295

(51) Int. Cl.
*H04N 9/73*  (2006.01)
*H04N 5/235*  (2006.01)
(Continued)

(52) U.S. Cl.
CPC ........... *H04N 5/2353* (2013.01); *H04N 5/2357* (2013.01); *H04N 5/3572* (2013.01); *H04N 5/3575* (2013.01); *H04N 5/361* (2013.01);
(Continued)

(58) Field of Classification Search
USPC .............................. 349/112; 348/222.1, 223.1, 348/226.1–228.1, 246–247, 251
See application file for complete search history.

(56) References Cited

U.S. PATENT DOCUMENTS 7,432,961 B2 * 10/2008 Takeshita ................... 348/227.1
2004/0080637 A1 * 4/2004 Nakamura et al. ............ 348/255
(Continued)

FOREIGN PATENT DOCUMENTS

JP    05-328365    12/1993
JP    08-125918    5/1996
(Continued)

OTHER PUBLICATIONS

English Translation of International Preliminary Report mailed Dec. 14, 2006.
(Continued)

*Primary Examiner* — Daniel M Pasiewicz
(74) *Attorney, Agent, or Firm* — Fishman Stewart Yamaguchi PLLC

(57) ABSTRACT

The present invention is to allow an XY-address scanning-type imaging device such as a CMOS imaging device to detect a fluorescent flicker correctly and accurately and reduce a fluorescent flicker component surely and sufficiently. The RGB primary color signals arising from A/D conversion of the RGB primary color signals obtained from an imaging element are clamped. Subsequently, for the clamped RGB primary color signals, the following processes are executed: correction of the gains of reading-out channels; reduction of fixed pattern noise; correction of the data of defective pixels; noise reduction; lens shading correction; and gain adjustment for exposure adjustment. Thereafter, for the resultant signals, a flicker detection and reduction unit detects and reduces a flicker component. Furthermore, white balance adjustment is implemented for the RGB primary color signals for which the flicker has been reduced.

10 Claims, 12 Drawing Sheets

(51) Int. Cl.
  *H04N 5/357* (2011.01)
  *H04N 5/361* (2011.01)
  *H04N 5/365* (2011.01)
  *H04N 5/367* (2011.01)
  *H04N 5/374* (2011.01)
  *H04N 5/378* (2011.01)

(52) U.S. Cl.
  CPC .............. *H04N5/3651* (2013.01); *H04N 5/367* (2013.01); *H04N 5/3742* (2013.01); *H04N 5/378* (2013.01)

(56) References Cited

U.S. PATENT DOCUMENTS

2004/0179114 A1* 9/2004 Silsby et al. ............... 348/226.1
2006/0256207 A1* 11/2006 Kokubo et al. ............ 348/223.1

FOREIGN PATENT DOCUMENTS

| JP | 11-164192 A | 6/1999 |
| JP | 2000-023040 A | 1/2000 |
| JP | 2000-165752 A | 6/2000 |
| JP | 2000-350102 A | 12/2000 |
| JP | 2001-016508 A | 1/2001 |
| JP | 2001-186407 | 7/2001 |
| JP | 2001-352552 | 12/2001 |
| JP | 2004-153705 | 5/2004 |

OTHER PUBLICATIONS

English Translation of Written Opinion of the International Searching Authority.

Japanese Office Action issued Jun. 10, 2009 for corresponding Japanese Application No. 2004-163295.

* cited by examiner

FIG.5

$$In'(x,y) = [1 + \Gamma n(y)] * In(x,y) \quad \cdots (1)$$

WHERE $$\Gamma n(y) = \sum_{m=1}^{\infty} \gamma m * \cos[m * (2\pi/\lambda o) * y + \Phi mn]$$

$$= \sum_{m=1}^{\infty} \gamma m * \cos(m * \omega o * y + \Phi mn) \quad \cdots (2)$$

$$\Delta \Phi mn = (-2\pi/3) * m \quad \cdots (3)$$

$$Fn(y) = \sum_x In'(x,y) = \sum_x \{[1 + \Gamma n(y)] * In(x,y)\}$$

$$= \sum_x In(x,y) + \Gamma n(y) \sum_x In(x,y)$$

$$= \alpha n(y) + \alpha n(y) * \Gamma n(y) \quad \cdots (4)$$

WHERE $$\alpha n(y) = \sum_x In(x,y) \quad \cdots (5)$$

FIG. 6

$$AVE[Fn(y)] = (1/3) \sum_{k=0}^{2} Fn\_k(y)$$

$$= (1/3) \left\{ \sum_{K=0}^{2} \alpha n\_k(y) + \alpha n\_k(y) * \Gamma n\_k(y) \right\}$$

$$= (1/3) \sum_{K=0}^{2} \alpha n\_k(y) + (1/3) \sum_{K=0}^{2} \alpha n\_k(y) * \Gamma n\_k(y)$$

$$= \alpha n(y) + (1/3) * \alpha n(y) \sum_{K=0}^{2} \Gamma n\_k(y)$$

$$= \alpha n(y) \qquad \cdots (6)$$

WHERE $$\alpha n(y) \doteqdot \alpha n\_1(y) \doteqdot \alpha n\_2(y) \qquad \cdots (7)$$

$$Fn(y) - Fn\_1(y)$$
$$= \{\alpha n(y) + \alpha n(y) * \Gamma n(y)\} - \{\alpha n\_(y) + \alpha n\_(y) * \Gamma n\_1(y)\}$$
$$= \alpha n(y) * \{\Gamma n(y) - \Gamma n\_1(y)\}$$
$$= \alpha n(y) \sum_{m=1}^{\infty} \gamma m * \{\cos(m * \omega o * y + \Phi mn)$$
$$\qquad\qquad - \cos(m * \omega o * y + \Phi mn\_1)\}$$
$$\qquad\qquad\qquad\qquad \cdots (8)$$

FIG. 7

$$g_n(y) = \{F_n(y) - F_{n\_1}(y)\} / \text{AVE}[F_n(y)]$$

$$= \sum_{m=1}^{\infty} \gamma_m * \{\cos(m*\omega_0*y + \Phi_{mn})$$
$$\qquad\qquad -\cos(m*\omega_0*y + \Phi_{mn\_1})\}$$

$$= \sum_{m=1}^{\infty} (-2)\gamma_m \{\sin[m*\omega_0*y + (\Phi_{mn}+\Phi_{mn\_1})/2]$$
$$\qquad\qquad * \sin[(\Phi_{mn}-\Phi_{mn\_1})/2]\}$$
$$\qquad\qquad\qquad\qquad\qquad \cdots (9)$$

---

$$g_n(y) = \sum_{m=1}^{\infty} (-2)\gamma_m * \sin(m*\omega_0*y + \Phi_{mn} + m*\pi/3)$$
$$\qquad\qquad * \sin(-m*\pi/3)$$

$$= \sum_{m=1}^{\infty} 2*\gamma_m * \cos(m*\omega_0*y + \Phi_{mn} + m*\pi/3 - \pi/2)$$
$$\qquad\qquad * \sin(m*\pi/3)$$

$$= \sum_{m=1}^{\infty} 2*\gamma_m * \sin(m*\pi/3)$$
$$\qquad\qquad * \cos(m*\omega_0*y + \Phi_{mn} + m*\pi/3 - \pi/2)$$

$$= \sum_{m=1}^{\infty} |A_m| * \cos(m*\omega_0*y + \theta_m) \qquad \cdots (10)$$

WHERE
$$|A_m| = 2*\gamma_m * \sin(m*\pi/3) \qquad \cdots (11a)$$
$$\theta_m = \Phi_{mn} + m*\pi/3 - \pi/2 \qquad \cdots (11b)$$

FIG. 8

$$\gamma m = |Am| / [2 * \sin(m * \pi / 3)] \qquad \cdots (12a)$$

$$\Phi mn = \theta m - m * \pi / 3 + \pi / 2) \qquad \cdots (12b)$$

$$DFT[gn(y)] = Gn(m) = \sum_{i=0}^{L-1} gn(i) * W^{m*i} \qquad \cdots (13)$$

WHERE
$$W = \exp[-j * 2\pi / L] \qquad \cdots (14)$$

$$|Am| = 2 * |Gn(m)| / L \qquad \cdots (15a)$$

$$\theta m = \tan^{-1}\{Im[Gn(m)] / Re[Gn(m)]\} \qquad \cdots (15b)$$

WHERE
Im[Gn(m)] : IMAGINARY PART
Re[Gn(m)] : REAL PART $$\gamma m = |Gn(m)| / [L * \sin(m * \pi / 3)] \qquad \cdots (16a)$$

$$\Phi mn = \tan^{-1}\{Im[Gn(m)] / Re[Gn(m)]\} - m * \pi / 3 + \pi / 2 \qquad \cdots (16b)$$

$$In(x,y) = In'(x,y) / [1 + \Gamma n(y)] \qquad \cdots (17)$$

FIG. 9

$$g_n(y) = F_n(y) / \text{AVE}[F_n(y)]$$
$$= 1 + \sum_{m=1}^{\infty} \gamma_m * \cos(m * \omega_0 * y + \Phi_{mn}) \quad \cdots (18)$$

$$g_n(y) - 1 = \sum_{m=1}^{\infty} \gamma_m * \cos(m * \omega_0 * y + \Phi_{mn})$$
$$= \sum_{m=1}^{\infty} |A_m| * \cos(m * \omega_0 * y + \theta_m) \quad \cdots (19)$$

$$\gamma_m = 2 * |G_n(m)| / L \quad \cdots (20a)$$
$$\Phi_{mn} = \tan^{-1}\{\text{Im}[G_n(m)] / \text{Re}[G_n(m)]\} \quad \cdots (20b)$$

WHERE

Im[$G_n(m)$] : IMAGINARY PART

Re[$G_n(m)$] : REAL PART

IMAGING DEVICE AND SIGNAL PROCESSING METHOD FOR FLICKER REDUCTION

TECHNICAL FIELD

The present invention relates to an imaging device typified by a video camera and a digital still camera employing an XY-address scanning-type imaging element (imager, image sensor) such as a CMOS (complementary metal oxide semiconductor) imaging element, and to a method for processing a video signal obtained from the imaging element when an imaging target is imaged by the imaging device.

BACKGROUND ART

When an imaging target is imaged through a video camera under illumination with a fluorescent lamp operated by a commercial AC power supply (home power supply), a video signal as the imaging output involves time-dependent brightness variation, i.e., a so-called fluorescent flicker depending on the difference between the frequency of luminance variation (light amount variation) of the fluorescent lamp (this frequency is twice the power supply frequency) and the vertical synchronous frequency of the camera (imaging frequency).

For example, when an imaging target is imaged by an NTSC (vertical synchronous frequency (field frequency, in this case) is 60 Hz) CCD camera in a local area in which the commercial AC power supply frequency is 50 Hz and under illumination with a non-inverter-type fluorescent lamp (although not limited to the case of using a non-inverter-type fluorescent lamp because an inverter-type fluorescent lamp also involves a flicker if its rectification is insufficient), as shown in FIG. 10, the time period of one field is $1/60$ seconds while the cycle of luminance variation of the fluorescent lamp is $1/100$ seconds. Therefore, the exposure timings of the respective fields involve offsets with respect to the luminance variation of the fluorescent lamp, and hence the exposure amounts of the respective pixels change field by field.

Accordingly, when the exposure time is $1/60$ seconds for example, the exposure amount is different among periods a1, a2, and a3 although these periods have the same exposure time. Also when the exposure time is shorter than $1/60$ seconds (and when it is not $1/100$ seconds to be described later), the exposure amount is different among periods b1, b2, and b3 although these periods have the same exposure time.

The relationship between the exposure timing and the phase of the luminance variation of the fluorescent lamp reverts to the initial state at every three fields, and hence the brightness variation due to the flicker has a repetition cycle of three fields. That is, the luminance ratio among the respective fields (how the flicker looks) changes depending on the exposure time, while the frequency of the flicker is the same irrespective of the exposure time.

When a progressive scan camera such as a digital still camera is used and thus the vertical synchronous frequency (frame frequency, in this case) is 30 Hz, the same brightness variation is repeated every three frames.

A fluorescent lamp normally employs plural fluorescent substances of e.g. red, green and blue in order to emit white light. However, these fluorescent substances each have a unique afterglow characteristic, and provide attenuated emission based on the respective afterglow characteristics during the periods, existing in the cycle of the luminance variation, from a glowing end to the next glowing start. Therefore, during these periods, light that is initially white light is attenuated with the hue thereof gradually changing. Consequently, the above-described offsets of the exposure timings lead not only to the brightness variation but also to hue variation. Furthermore, a fluorescent lamp has a specific spectroscopic characteristic in which a strong peak exists at a particular wavelength, and thus a variation component of a signal is different from color to color.

The hue variation and difference of a variation component on each color basis lead to the occurrence of a so-called color flicker.

On the contrary, when the power supply frequency is 50 Hz and the vertical synchronous frequency of the imaging device is 60 Hz like in FIG. 10, if the exposure time is set to $1/100$ seconds, which is the same as the cycle of luminance variation of the fluorescent lamp, as shown in the lowest row in FIG. 10, the exposure amount is constant irrespective of the exposure timing, which causes no flicker.

Actually, a scheme has been devised in which the exposure time is set to $1/100$ seconds when the camera is used under illumination with a fluorescent lamp by detecting the condition that the camera is used under illumination with a fluorescent lamp through user's operation or signal processing in the camera. According to this scheme, the occurrence of a flicker can be prevented completely with a simple method.

However, this scheme precludes the exposure time from being optionally set to any time, which reduces the flexibility of the exposure amount adjuster for obtaining adequate exposure.

To address this, another method for reducing a fluorescent flicker without defining the shutter speed has also been devised. In an imaging device in which all the pixels in one image plane are exposed at the same exposure timing, such as a CCD imaging device, only inter-frame brightness variation and inter-frame color variation appear due to a flicker, and therefore reduction in the flicker can be achieved comparatively easily.

For example, in the example of FIG. 10, the repetition cycle of the flicker is three fields unless the exposure time is $1/100$ seconds. Therefore, the flicker can be suppressed to a level causing no problem in practical use by predicting the luminance and color variation of the present field from the video signal of the field three fields before the present field so that the average of video signals of the respective fields is kept constant, and then adjusting the gains of the video signals of the respective fields depending on the prediction result.

On the other hand, in an XY-address scanning-type imaging element such as a CMOS imaging element, the exposure timing is sequentially shifted by one cycle of the reading clock (pixel clock) pixel by pixel in the horizontal direction of the image plane, and hence the exposure timings of all the pixels are different from each other. Accordingly, the above-described method cannot suppress the flicker sufficiently.

FIG. 11 shows an operation example of an XY-address scanning-type imaging element. As described above, the exposure timing is sequentially delayed on each pixel basis also in the horizontal direction of the image plane. However, one horizontal cycle is sufficiently shorter than the cycle of luminance variation of a fluorescent lamp. Therefore, the following description is based on an assumption that the exposure timings of the pixels on the same line are identical to each other, and the exposure timings of the respective lines across the vertical direction of the image plane are shown based on this assumption. In an actual case, even such an assumption causes no problem.

As shown in FIG. 11, in a CMOS imaging device as an example of the XY-address scanning-type imaging device, the exposure timing is different from line to line (F0 indicates the difference of the exposure timing among the respective lines in a certain field), and hence a difference in the exposure amount arises among the respective lines. Therefore, not only inter-field brightness variation and inter-field color variation but also in-field brightness variation and in-field color variation occur due to a flicker. On the image plane, this in-field variation appears as a streak pattern (the direction of the streaks themselves is the horizontal direction, and the direction of changes of the streaks is the vertical direction).

FIG. 12 shows an example of the in-field (in-image plane) flicker when an imaging target is based on a uniform pattern. Since one cycle (one wavelength) of the streak pattern is 1/100 seconds, a streak pattern of 1.666 cycles arises in one image plane. If the number of reading-out lines per one field is defined as M, the number of reading-out lines corresponding to one cycle of the streak pattern is L=M*60/100. Note that an asterisk (*) is used as a sign of multiplication in the present specification and drawings.

As shown in FIG. 13, three fields (three image planes) correspond to five cycles (five wavelengths) of the streak pattern, and the streak pattern looks like a pattern flow in the vertical direction when being viewed continuously.

Although only brightness variation due to a flicker is shown in FIGS. 12 and 13, the above-described color variation is also added to the brightness variation actually, which significantly deteriorates the image quality. In particular, the color flicker becomes more prominent as the shutter speed becomes higher (the exposure time becomes shorter). Furthermore, in an XY-address scanning-type imaging device, the influence of the color flicker appears on the image plane, and therefore the image quality deterioration is more noticeable.

Also in the case of such an XY-address scanning-type imaging device, when the power supply frequency is 50 Hz and the vertical synchronous frequency of the imaging device is 60 Hz like in FIG. 11 for example, setting the exposure time to 1/100 seconds, which is the same as the cycle of luminance variation of the fluorescent lamp, allows the exposure amount to be constant irrespective of the exposure timing, which prevents the occurrence of a fluorescent flicker including an in-plane flicker.

However, if the allowable exposure time is limited to 1/100 seconds for prevention of a flicker, the flexibility of the exposure amount adjuster for obtaining adequate exposure is reduced.

To address this, some methods have been proposed to reduce a fluorescent flicker inherent in an XY-address scanning-type imaging device such as a CMOS imaging device without thus defining the shutter speed.

Specifically, Patent Document 1 (Japanese Patent Laid-open No. 2000-350102) and Patent Document 2 (Japanese Patent Laid-open No. 2000-23040) disclose a method in which a flicker component is estimated through measurement of the light amount of a fluorescent lamp by use of a light-receiving element and a light-measuring element, and the gain of a video signal from the imaging element is controlled depending on the estimation result. However, in this method, the addition of the light-receiving element and light-measuring element to the imaging device problematically increases the size and costs of the imaging device system.

Patent Document 3 (Japanese Patent Laid-open No. 2001-16508) discloses another method. In this method, two kinds of images are captured under two conditions: with use of a first electronic shutter value that is suitable for the present external light condition; and with use of a second electronic shutter value that has a predetermined relation to the blinking cycle of the fluorescent lamp, and then a flicker component is estimated by comparing the signals of both the conditions with each other to thereby control the gain of a video signal from the imaging element depending on the estimation result. However, this method is not suitable for capturing of a moving image.

Furthermore, Patent Document 4 (Japanese Patent Laid-open No. 2000-165752) discloses a method in which a correction coefficient is calculated from two video signals obtained through exposure with such a time interval that the phases of flickers of the video signals are shifted from each other by just 180 degrees, so that the video signals are corrected with use of the calculated correction coefficient. However, this method is also not suitable for capturing of a moving image.

In addition, Patent Document 5 (Japanese Patent Laid-open No. Hei 11-164192) discloses another method. In this method, the behavior of brightness variation under illumination with a fluorescent lamp is recorded in a memory as a correction coefficient in advance, and the phase of a flicker component is detected from a video signal from the imaging element by use of the difference of the frequency between the video signal component and flicker component, to thereby correct the video signal with use of the correction coefficient in the memory depending on the detection result.

DISCLOSURE OF INVENTION

However, if in an XY-address scanning-type imaging device such as a CMOS imaging device, a fluorescent flicker is detected (estimated) from a video signal obtained through an imaging element, and then the level or gain of the video signal is corrected depending on the detection result to thereby reduce the flicker component, it is important where the stage at which the flicker detection and reduction processing is executed should exist in the process of processing for the video signal obtained through the imaging element.

Various kinds of processing are required for a video signal from an imaging element. In particular, an XY-address scanning-type imaging device such as a CMOS imaging device requires processing that is unique to the XY-address scanning-type imaging devices but is not needed in CCD imaging devices. Therefore, in terms of the relationship between the flicker detection and reduction processing and other kinds of processing, the place of the stage at which the flicker detection and reduction processing is executed has a large effect on the flicker detection accuracy and hence the flicker reduction effect. Depending on the relationship between the flicker detection and reduction processing and other kinds of processing, there is a possibility that the flicker detection accuracy is lowered, and thus due to erroneous correction associated with the erroneous detection, the flicker component cannot be reduced but rather is increased.

An object of the present invention is to allow an XY-address scanning-type imaging device such as a CMOS imaging device to detect a fluorescent flicker correctly and accurately and reduce a fluorescent flicker component surely and sufficiently.

A signal processing method according to the invention is a method for processing a video signal obtained through imaging of an imaging target by an XY-address scanning-type imaging element. The method includes a correction step for correcting a level or gain of a video signal arising from analog-to-digital conversion of the video signal, and a flicker detection and reduction step for detecting a fluorescent flicker component from the corrected video signal and reducing the fluorescent flicker component, after the correction step.

In the signal processing method with the above-described feature according to the invention, the flicker detection and reduction processing is executed after the execution of the processing of correcting the level or gain of a video signal, such as the processing of equalizing the signal gains of a plurality of reading-out channels in reading out of the video signal through the plurality of reading-out channels from the imaging element, the processing of reducing fixed pattern noise of the imaging element, or the processing of correcting lens shading. Therefore, a fluorescent flicker can be detected correctly and accurately, and hence a fluorescent flicker component can be reduced surely and sufficiently.

BRIEF DESCRIPTION OF DRAWINGS

FIG. 5 shows equations used for an explanation of a flicker detection and reduction method of a specific example.

FIG. 6 shows equations used for the explanation of the flicker detection and reduction method of the specific example.

FIG. 7 shows equations used for the explanation of the flicker detection and reduction method of the specific example.

FIG. 8 shows equations used for the explanation of the flicker detection and reduction method of the specific example.

FIG. 9 shows equations used for the explanation of the flicker detection and reduction method of the specific example.

BEST MODE FOR CARRYING OUT THE INVENTION

Figure 1:
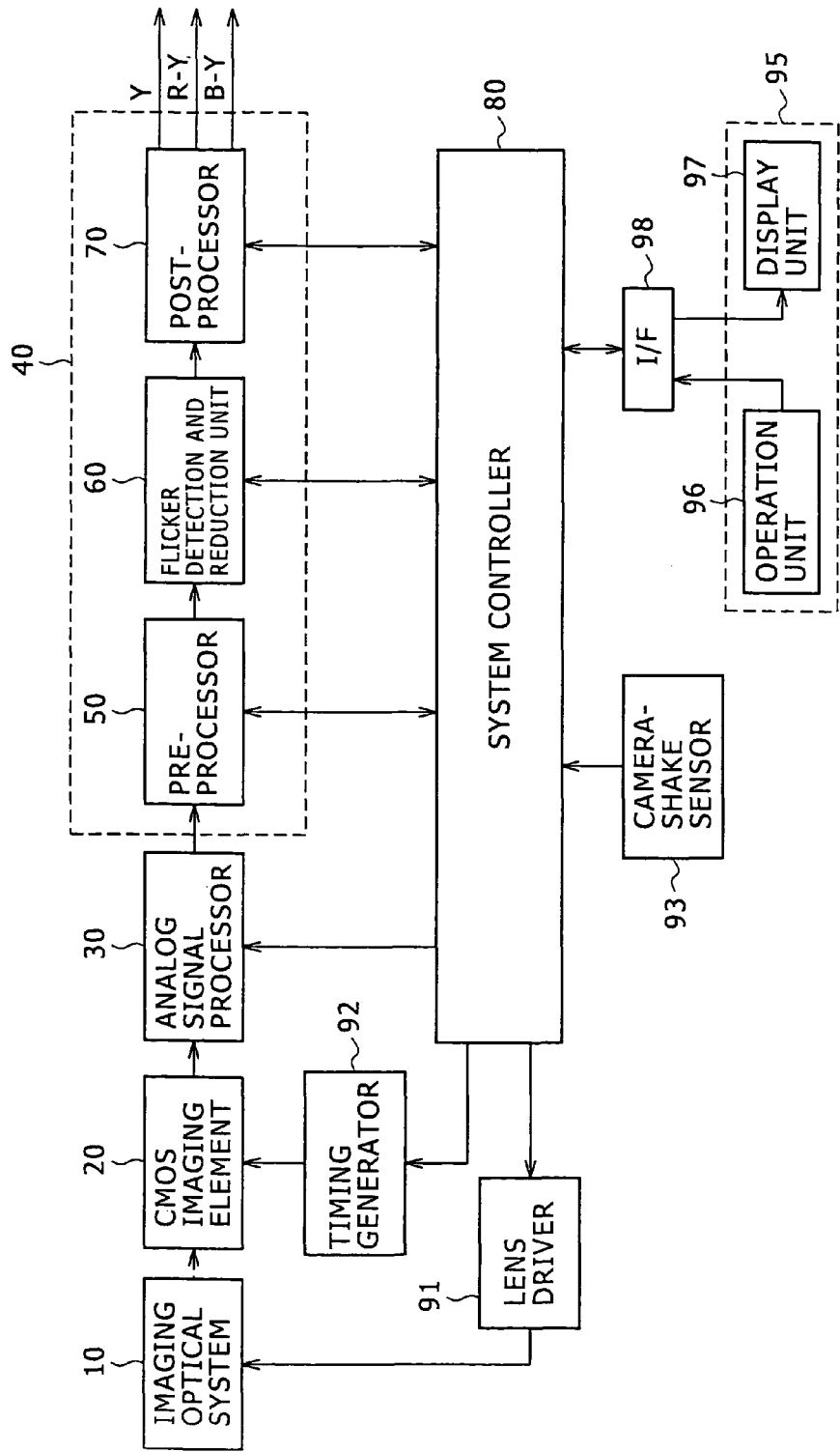
FIG. 1 is a diagram illustrating the system configuration of one example of an imaging device according to the invention.
Figure 2:
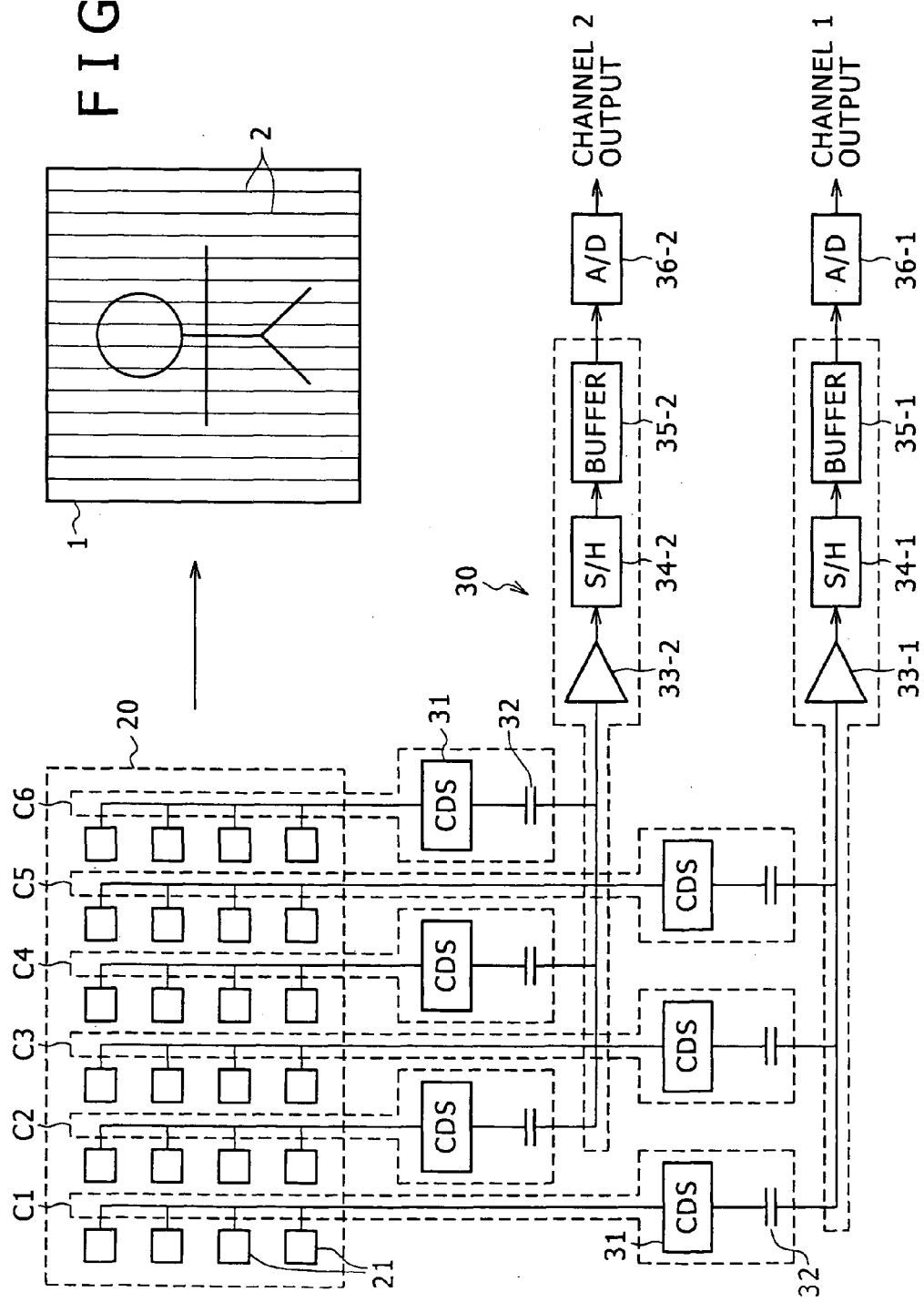
FIG. 2 is a diagram illustrating one example of an imaging device from which a video signal is read out through a plurality of reading-out channels.
Figure 3:
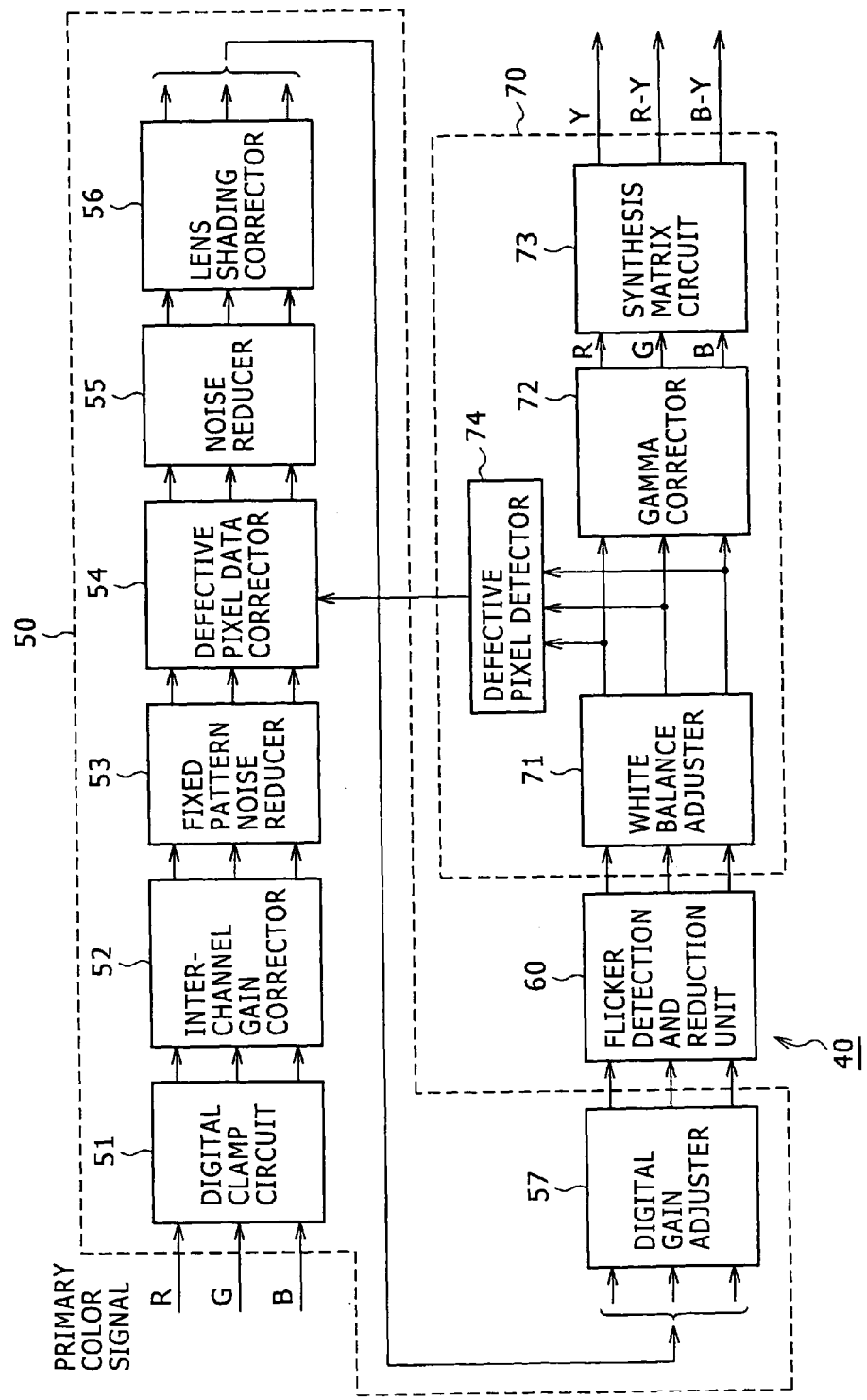
FIG. 3 is a diagram illustrating one example of a digital signal processor in the imaging device of FIG. 1.

[Embodiment of Imaging Device and Signal Processing Method: FIGS. 1 to 3]
(System Configuration of Imaging Device: FIG. 1)

FIG. 1 illustrates the system configuration of one example of an imaging device according to the present invention, and shows e.g. an NTSC (vertical synchronous frequency is 60 Hz) or PAL (it is 50 Hz) video camera employing a CMOS imaging element as an XY-address scanning-type imaging element.

In the imaging device of this example, light from an imaging target enters a CMOS imaging element 20 via an imaging optical system 10, followed by being subjected to photoelectric conversion by the CMOS imaging element 20, so that an analog video signal is obtained from the CMOS imaging element 20.

The CMOS imaging element 20 is formed by two-dimensionally arranging on a CMOS substrate a plurality of pixels each including a photo diode (photo gate), a transfer gate (shutter transistor), a switching transistor (address transistor), an amplifier transistor, a reset transistor (reset gate), and so on. Furthermore, a vertical scan circuit, a horizontal scan circuit and a video signal output circuit are formed in the CMOS imaging element 20.

The CMOS imaging element 20 may be either of an element for the primary colors or an element for the complementary colors as described later. Analog video signals obtained from the CMOS imaging element 20 are the RGB primary color signals or complementary color signals.

The analog video signals obtained from the CMOS imaging element 20 are sampled and held on each color signal basis by an analog signal processor 30 configured as an IC (integrated circuit). In the analog signal processor 30, the gains of the analog video signals are controlled through AGC (automatic gain control), and the resultant analog video signals are converted into digital video signals through A/D conversion.

The digital video signals from the analog signal processor 30 are processed as described later in a pre-processor 50 in a digital signal processor 40 configured as an IC. Subsequently, in a flicker detection and reduction unit 60 in the digital signal processor 40, a fluorescent flicker component is detected and reduced on each signal component basis as described later. Thereafter, in a post-processor 70 in the digital signal processor 40, the resultant signals are processed as described later so as to be finally converted into a luminance signal Y and red and blue color difference signals R-Y and B-Y, followed by being output from the digital signal processor 40.

A system controller 80 is formed of a microcomputer or the like, and controls the respective units in the camera.

Specifically, a lens-driving control signal is supplied from the system controller 80 to a lens driver 91 configured with an IC, and the lens driver 91 drives the lens and iris in the imaging optical system 10.

Furthermore, a timing control signal is supplied from the system controller 80 to a timing generator 92, and various kinds of timing signals are supplied from the timing generator 92 to the CMOS imaging element 20, so that the CMOS imaging element 20 is driven. At this time, the shutter speed of the CMOS imaging element 20 is also freely controlled based on the timing control signal from the system controller 80.

In addition, detection signals of the respective signal components are loaded from the digital signal processor 40 into the system controller 80, so that based on an AGC signal from the system controller 80, the gains of the respective color signals are controlled by the analog signal processor 30 as described above, and the signal processing in the digital signal processor 40 is controlled by the system controller 80.

Moreover, the system controller 80 is coupled to a camera-shake sensor 93 so that camera-shake information obtained from the camera-shake sensor 93 is utilized for shake correction control. In addition, when an imaging target drastically changes in a short time period due to a motion of the camera user, this large change is detected by the system controller 80 through an output from the camera-shake sensor 93, and the flicker detection and reduction unit 60 is controlled.

Furthermore, the system controller 80 is coupled via an interface 98 configured by a microcomputer or the like to an operation unit 96 and a display unit 97 that serve as a user interface 95. Thus, setting operation, selection operation and so on through the operation unit 96 are detected by the system controller 80, and the setting status, control status, and so on of the camera are displayed on the display unit 97 under control by the system controller 80.

When an imaging target drastically changes in a short time period due to camera operation such as zoom operation by the camera user through the operation unit 96, this large change is detected by the system controller 80, and the flicker detection and reduction unit 60 is controlled.

When the situation where the flicker detection and reduction processing is originally unnecessary, such as in outdoor imaging or in imaging in a still-image imaging mode, is detected by the system controller 80, the flicker detection and reduction unit 60 is controlled.

(Reading-Out Channel and Fixed Pattern Noise: FIG. 2)

XY-address scanning-type imaging elements such as CMOS imaging elements have flexibility in a method for reading-out pixels unlike CCD imaging elements. Specifically, a signal of a pixel at any place (address) can be read out with any reading method optionally through plural reading-out channels. This feature applies also to the CMOS imaging element 20 of the example in FIG. 1.

This feature is shown in FIG. 2. The CMOS imaging element 20 is formed of e.g. CMOS imaging elements for the respective colors of RGB as a three-plate system for the primary colors. Pixels 21 in the CMOS imaging elements for the respective colors are coupled on each column basis to reading-out lines C1, C2, C3, C4, each including a CDS (Correlated Double Sampling) circuit 31 and a charge accumulation capacitor 32 based on a column architecture system. When the number of the reading-out channels is e.g. two, pixel signals read out through every other reading-out lines C1, C3, . . . are converted from a charge into a voltage by a QV amplifier 33-1, and then are sampled and held by a sample and hold circuit 34-1, followed by being supplied via a buffer 35-1 to an A/D converter 36-1 so as to be converted into digital pixel data of Channel 1. Furthermore, pixel signals read out through every other reading-out lines C2, C4, . . . are converted from a charge into a voltage by a QV amplifier 33-2, and then are sampled and held by a sample and hold circuit 34-2, followed by being supplied via a buffer 35-2 to an A/D converter 36-2 so as to be converted into digital pixel data of Channel 2.

Also when the CMOS imaging element 20 is a one-plate system for the primary colors and also when it is a system for the complementary colors, pixels can be read out through plural reading-out channels similarly.

When signals are read out from the CMOS imaging element 20 through plural reading-out channels in this manner, there is variation in the signal gain from channel to channel since the signal path is different channel by channel. If the subsequent signal processing for the read-out signals is carried out without taking into consideration this variation, the influence of the variation in the signal gain directly appears in the output image, and hence the image quality is significantly deteriorated.

Therefore, when signals are thus read out from the CMOS imaging element 20 through plural reading-out channels, it is required for the signal gains of the respective reading-out channels to be corrected so that the variation in the signal gain from channel to channel is eliminated as described later.

Furthermore, in XY-address scanning-type imaging elements such as CMOS imaging elements, fixed pattern noise occurs. Specifically, when signals are read out from the CMOS imaging element 20 based on a column architecture system like one in FIG. 2, the fixed pattern noise appears as vertical streak noise 2 on each column basis as shown in an output image 1 in FIG. 2.

This fixed pattern noise causes no problem in a bright scene. However, when the signal gain is increased for a dark scene, this noise often becomes nonnegligible. Therefore, when signals are read out from the CMOS imaging element 20 based on a column architecture system like one in FIG. 2, the signal levels are corrected so that the vertical streak noise 2 is reduced as described later.

(Digital Signal Processing Method: FIG. 3)

In the example of FIG. 1, the digital signal processor 40 is divided into the pre-processor 50, the flicker detection and reduction unit 60, and the post-processor 70. Furthermore, in this example, as shown in FIG. 3, the pre-processor 50 includes a digital clamp circuit 51, an inter-channel gain correction circuit 52, a fixed pattern noise reduction circuit 53, a defective pixel data correction circuit 54, a noise reduction circuit 55, a lens shading correction circuit 56, and a digital gain adjustment circuit 57 that are arranged in that order. The post-processor 70 includes a white balance adjustment circuit 71, a gamma correction circuit 72, and a synthesis matrix circuit 73 that are arranged in that order. Furthermore, the post-processor 70 includes a defective pixel detection circuit 74 that detects defective pixels in the CMOS imaging element 20 from an output signal from the white balance adjustment circuit 71.

When the output from the analog signal processor 30, i.e., the input to the digital signal processor 40, is the RGB primary color signals as described above, the black level of the input RGB primary color signals is clamped at a predetermined level by the digital clamp circuit 51, which is at the most anterior stage in the pre-processor 50.

For the RGB primary color signals of which black level has been clamped, the inter-channel gain correction circuit 52 at the subsequent stage corrects the signal gains of the respective reading-out channels so as to eliminate variation in the signal gain from channel to channel. The variation arises when signals are read out from the CMOS imaging element 20 through plural reading-out channels as described above.

Specifically, the gain difference among the reading-out channels is detected from the signal of a black signal region (optical black) that is disposed as pixels in the CMOS imaging element 20 in advance, and the gains of the respective reading-out channels are corrected by the gain difference.

The fixed pattern noise reduction circuit 53 at the subsequent stage reduces the above-described vertical streak fixed pattern noise in the RGB primary color signals that have been subjected to the inter-channel gain correction. Specifically, variation in the signal level from column to column is detected from the signal of the black signal region (optical black) that is disposed as pixels in the CMOS imaging element 20 in advance, and the signal levels of the respective columns are offset so that the variation is eliminated.

The defective pixel data correction circuit 54 at the subsequent stage corrects the data (pixel value) of defective pixels detected by the defective pixel detection circuit 74 in the post-processor 70 to be described later, in the RGB primary color signals for which the fixed pattern noise has been reduced. Specifically, the data of a defective pixel is calculated and produced from the data of peripheral pixels of the defective pixel by use of interpolation calculation, and the original data is replaced by the calculated and produced data.

The subsequent-stage noise reduction circuit 55 reduces noise in the RGB primary color signals for which the defective pixel data has been corrected. This noise to be reduced is general high-frequency noise different from the above-described fixed pattern noise. Specifically, to reduce the noise, filtering processing for extracting only low-frequency components is executed for the RGB primary color signals.

The lens shading correction circuit 56 at the subsequent stage corrects lens shading for the RGB primary color signals after the noise reduction. The lens shading is a phenomenon in which the signal amount is different depending on the imaging position. In general, an image becomes darker and the signal amount is decreased as the distance from the center of the optical axis of the lens becomes larger.

Specifically, the gains of the respective pixel data of the RGB primary color signals are adjusted so that the entire image plane has uniform brightness according to the shading information of the lens employed as the imaging optical system 10, described in a ROM table that is prepared in the system controller 80 or the digital signal processor 40 in advance, or according to the shading amounts set in the system controller 80 or the digital signal processor 40.

In the digital gain adjustment circuit 57, which is at the final stage of the pre-processor 50, the gains of the RGB primary color signals for which the lens shading has been corrected are adjusted for exposure adjustment based on the gain setting in the system controller 80. In the imaging device of this example, the exposure amount can be adjusted through iris setting, setting of the electronic shutter speed, and the gain adjustment by the digital gain adjustment circuit 57. This gain adjustment by the digital gain adjustment circuit 57 in association with the iris setting and the setting of the electronic shutter speed allows achievement of a desired exposure amount and realization of an automatic exposure adjustment function.

For the RGB primary color signals as the output from the digital gain adjustment circuit 57 at the final stage of the pre-processor 50, the flicker detection and reduction unit 60 detects a fluorescent flicker as described later, so that a flicker component is reduced.

For the RGB primary color signals of which flicker component has been reduced by the flicker detection and reduction unit 60, initially the white balance adjustment circuit 71 at the most anterior stage in the post-processor 70 adjusts the gains of the respective signals for white balance.

Furthermore, in the post-processor 70, the defective pixel detection circuit 74 detects defective pixels in the CMOS imaging element 20 on the output side of the white balance adjustment circuit 71.

In general, the detection of defective pixels is implemented under the condition of zero incident light. Therefore, for example, when the power of the camera is activated, the iris is closed instantaneously to thereby make the zero-incident-light state, so that defective pixels are specified from the then signal levels and the addresses of the defective pixels are stored in a storage in the system controller 80 or the digital signal processor 40. Since the positions (addresses) of the defective pixels do not change also during imaging, there is no need to detect defective pixels in real time after the defective pixels have been detected once. Therefore, during normal imaging, the detection operation of the defective pixel detection circuit 74 is not executed but the RGB primary color signals as the output from the white balance adjustment circuit 71 are directly input to the gamma correction circuit 72.

The gamma correction circuit 72 converts the grayscales of the RGB primary color signals after the white balance adjustment.

The synthesis matrix circuit 73 produces the luminance signal Y and the color difference signals R-Y and B-Y as the output from the digital signal processor 40 from the RGB primary color signals that have been subjected to the gamma correction.

Although the above-described processes are for a primary-color system, similar processes are implemented also when the respective complementary color signals are input to the digital signal processor 40 in a complementary-color system.

The execution of the respective processes by the digital signal processor 40 in the above-described order offers the following advantages.

<Relationship with Digital Clamp>

Initially, the relationship between digital clamp and the flicker detection and reduction processing will be described below. Specifically, unless the black level of a video signal has been defined before detection of a flicker component, the flicker component cannot be detected correctly and accurately, and hence the flicker component cannot be reduced surely and sufficiently.

For example, the black level of a video signal obtained from the CMOS imaging element 20 varies depending on the temperature and so on. However, if the black level of the video signal is correctly defined by the digital clamp, the black level is invariably kept constant in the subsequent signal processing, which allows execution of assured and stable processing.

In contrast, if the flicker detection and reduction processing is carried out before the digital clamp, the black level is not kept constant in the flicker detection and reduction processing. Therefore, a flicker component cannot be detected correctly and accurately, and hence the flicker component cannot be reduced surely and sufficiently. Furthermore, if the flicker detection processing is implemented before the digital clamp and the flicker reduction processing is implemented after the digital clamp, not only can a flicker component is unable to be detected correctly and accurately as described above, but the flicker component is unable to be reduced surely and sufficiently because the timing of the flicker detection is timewise offset from the timing of the flicker reduction achieved through correction of the signal level or signal gain according to the detection result.

On the contrary, if the digital clamp is executed before the flicker detection and reduction processing like in the example of FIG. 3, i.e., if the flicker detection and reduction processing is executed after the digital clamp, a flicker component can be detected correctly and accurately, and hence the flicker component can be reduced surely and sufficiently.

<Relationship with Inter-Channel Gain Correction>

The relationship between inter-channel gain correction and the flicker detection and reduction processing is as follows. Specifically, unless variation in the gain among reading-out channels has been eliminated before detection of a flicker component, the flicker component cannot be detected correctly and accurately, and hence the flicker component cannot be reduced surely and sufficiently.

More specifically, when the same color signals are read out through plural channels like in the example of FIG. 2 and the flicker detection and reduction processing is executed for each color signal like in the example of FIG. 3, unless variation in the gain among the reading-out channels has been eliminated before the processing, the detection level of a flicker component is different for each sampling point of the flicker detection. Therefore, the flicker component cannot be detected correctly and accurately, and hence the flicker component cannot be reduced surely and sufficiently. This applies also to a case where a flicker component is detected from one color signal or luminance signal, if the signal is read out through plural channels.

On the contrary, if the inter-channel gain correction is executed before the flicker detection and reduction processing like in the example of FIG. 3, i.e., if the flicker detection and reduction processing is executed after the inter-channel gain correction, a flicker component can be detected correctly and accurately, and hence the flicker component can be reduced surely and sufficiently.

<Relationship with Fixed Pattern Noise Reduction Processing>

The relationship between fixed pattern noise reduction processing and the flicker detection and reduction processing is as follows. Specifically, unless fixed pattern noise (FPN) has been reduced before detection of a flicker component, the flicker component cannot be detected correctly and accurately, and hence the flicker component cannot be reduced surely and sufficiently.

More specifically, in a bright scene, the ratio of the fixed pattern noise indicated as the vertical streak noise 2 in FIG. 2 to the video signal component is small, and therefore almost no problem is found. However, in a dark scene like one obtained under such illumination with a fluorescent lamp that a fluorescent flicker occurs, the ratio of the fixed pattern noise to the video signal component rapidly increases. Accordingly, the existence of the fixed pattern noise has an adverse effect on the flicker detection, and hence the flicker component cannot be detected correctly and accurately.

On the contrary, if the fixed pattern noise reduction processing is executed before the flicker detection and reduction processing like in the example of FIG. 3, i.e., if the flicker detection and reduction processing is executed after the fixed pattern noise reduction processing, a flicker component can be detected correctly and accurately, and hence the flicker component can be reduced surely and sufficiently.

<Relationship with Noise Reduction Processing>

The relationship between noise reduction processing and the flicker detection and reduction processing is as follows. Specifically, the noise to be reduced in this noise reduction processing has a sufficiently high frequency compared with a fluorescent flicker component. Therefore, it can be said that this noise does not adversely affect the flicker detection and reduction directly even when this noise reduction processing is not executed.

However, if the noise reduction processing is implemented before the flicker detection and reduction processing like in the example of FIG. 3, the noise component in a signal for which flicker detection is to be carried out can be further reduced. Therefore, the flicker detection can be implemented more correctly and more accurately, and hence the flicker reduction can be implemented more surely and more sufficiently.

<Relationship with Lens Shading Correction>

The relationship between lens shading correction and the flicker detection and reduction processing is as follows. Specifically, unless lens shading has been corrected before detection of a flicker component, the flicker component cannot be detected correctly and accurately, and hence the flicker component cannot be reduced surely and sufficiently.

More specifically, the degree of the lens shading becomes larger as the distance from the center of the optical axis becomes larger as described above, and therefore the video signal level becomes lower as the distance from the center of the optical axis becomes larger. When variation in incident light occurs uniformly across the whole of an imaging target, although the flicker itself is uniform across the whole of the imaging target, the flicker level as the video signal varies depending on the lens shading. Therefore, unless the lens shading has been corrected before the flicker detection and reduction processing, the flicker level cannot be detected correctly, and hence the flicker component cannot be reduced surely. In particular, when a flicker component is detected as a sine wave or superimposed low-order sine waves like in an example to be described later, the existence of a difference in the video signal level across the vertical direction of the image plane causes troubles in the flicker level detection.

On the contrary, if the lens shading is corrected before the flicker detection and reduction processing like in the example of FIG. 3, i.e., if the flicker detection and reduction processing is executed after the lens shading correction, a flicker component can be detected correctly and accurately, and hence the flicker component can be reduced surely and sufficiently.

<Relationship with Digital Gain Adjustment>

Since digital gain adjustment is to achieve automatic exposure adjustment as described above, a video signal after the adjustment has a constant exposure amount. Under a condition where an exposure amount can be held constant only through the iris setting and the setting of the electronic shutter speed, there is no case where a problem is caused depending on the timing at which the flicker detection and reduction processing is executed in terms of the relationship between the flicker detection and reduction processing and exposure amount adjustment. In contrast, if execution of the flicker detection and reduction processing is executed before an exposure amount is adjusted through the digital gain adjustment, the level of a video signal input to the flicker detection and reduction unit varies largely according to the imaging target. Accordingly, a flicker component cannot be detected correctly and accurately.

On the contrary, if the digital gain adjustment is executed before the flicker detection and reduction processing like in the example of FIG. 3, i.e., if the flicker detection and reduction processing is executed after the digital gain adjustment, a flicker component can be detected correctly and accurately, and hence the flicker component can be reduced surely and sufficiently.

<Relationship with White Balance Adjustment>

The relationship between white balance adjustment and the flicker detection and reduction processing is as follows. Specifically, if a flicker component is superimposed on a color signal separately on each color signal basis, execution of the flicker detection and reduction processing after the white balance adjustment results in a state where an input video signal varies separately on each color basis from a viewpoint of the white balance adjustment, which causes troubles in extraction of the white region. As a result, adequate white balance fails to be obtained.

On the contrary, if the flicker detection and reduction processing is executed before the white balance adjustment like in the example of FIG. 3, i.e., if the white balance adjustment is executed after the flicker detection and reduction processing, the white region can be extracted correctly, and hence adequate white balance can be achieved surely.

<Relationship with Defective Pixel Detection>

If detection of defective pixels is not implemented during imaging as described above, the relationship between the defective pixel detection and the flicker detection and reduction processing does not matter particularly. In general, the defective pixel detection is carried out in a state where incident light is zero. However, even when incident light is not zero, defective pixels can be specified comparatively easily as long as the detection is executed in a very dark scene. Furthermore, since typically a scene in which defective pixels are noticeable is a dark scene, it is possible to employ not just the method in which defective pixels are detected in a state where incident light is zero but a method in which defective pixels are detected in real time while a dark scene is imaged. However, in the latter method, if a flicker component is contained in input video signals at the time of the defective pixel detection, the defective pixel detection is adversely affected, and hence defective pixels cannot be detected correctly.

On the contrary, if the flicker detection and reduction processing is executed before the defective pixel detection like in the example of FIG. 3, i.e., if defective pixels are detected after the flicker detection and reduction processing, defective pixels can be detected correctly even when the method in which defective pixels are detected in real time while a dark scene is imaged is employed as the defective pixel detection method in the defective pixel detection circuit 74. Therefore, the data of the defective pixels can be corrected with high accuracy in the defective pixel data correction circuit 54.

[Flicker Detection and Reduction Method: FIGS. 4 to 9]

There is no particular limitation on the method itself for detecting and reducing a flicker in the flicker detection and reduction unit 60.

It is impossible to employ a method in which a flicker component is estimated (detected) through measurement of the light amount of a fluorescent lamp by use of a light-receiving element and a light-measuring element like the method disclosed in the above-described Patent document 1 (Japanese Patent Laid-open No. 2000-350102) or Patent document 2 (Japanese Patent Laid-open No. 2000-23040). However, any other method may be employed as long as the method is to detect (estimate) a flicker component by use of the continuity of a fluorescent flicker from a video signal arising from A/D conversion of a video signal obtained from an imaging element, and then correct the level or gain of the video signal according to the detection result to thereby reduce the flicker component.

In the above-described example of the invention, to detect and reduce a flicker component, the flicker detection and reduction unit 60 is disposed between the pre-processor 50, which includes the digital clamp circuit 51, the inter-channel gain correction circuit 52, the fixed pattern noise reduction circuit 53, the defective pixel data correction circuit 54, the noise reduction circuit 55, the lens shading correction circuit 56 and the digital gain adjustment circuit 57, and the post-processor 70, which includes the white balance adjustment circuit 71, the gamma correction circuit 72, the synthesis matrix circuit 73 and the defective pixel detection circuit 74, in the digital signal processor 40.

There is no particular limitation on the flicker detection and reduction method itself as described above. However, according to the method in a prior application (Japanese Patent Application No. 2003-173642) relating to the invention by the present inventor, a fluorescent flicker component that is inherent in XY-address scanning-type imaging elements such as CMOS imaging elements can be detected correctly and accurately and can be reduced surely and sufficiently through simple signal processing irrespective of an imaging target, a video signal level, and the kind of a fluorescent lamp, etc.

The flicker detection and reduction method of the prior application includes the steps of (a) integrating an input image signal that is a video signal (color signal of each color or luminance signal) from an imaging element across a time period of at least one horizontal cycle, (b) normalizing the integrated value or the difference value of the integrated values of neighboring fields or frames, (c) extracting the spectrum of the normalized integrated value or difference value, (d) estimating a flicker component from the extracted spectrum, and (e) executing arithmetic on the estimated flicker component and the input image signal so that the estimated flicker component is cancelled.

The normalization step (b) includes one of the sub-steps of (b1) dividing the difference value by the average of the integrated values of consecutive plural fields or frames, (b2) dividing the integrated value by the average of the integrated values of consecutive plural fields or frames, followed by subtraction of a predetermined value from the division result, and (b3) dividing the difference value by the integrated value. Furthermore, the spectrum extraction step (c) employs a method of subjecting the normalized integrated value or difference value to the Fourier transform, or the like.

(Configuration Example of Flicker Detection and Reduction Unit: FIGS. 4 to 9)

Figure 4:
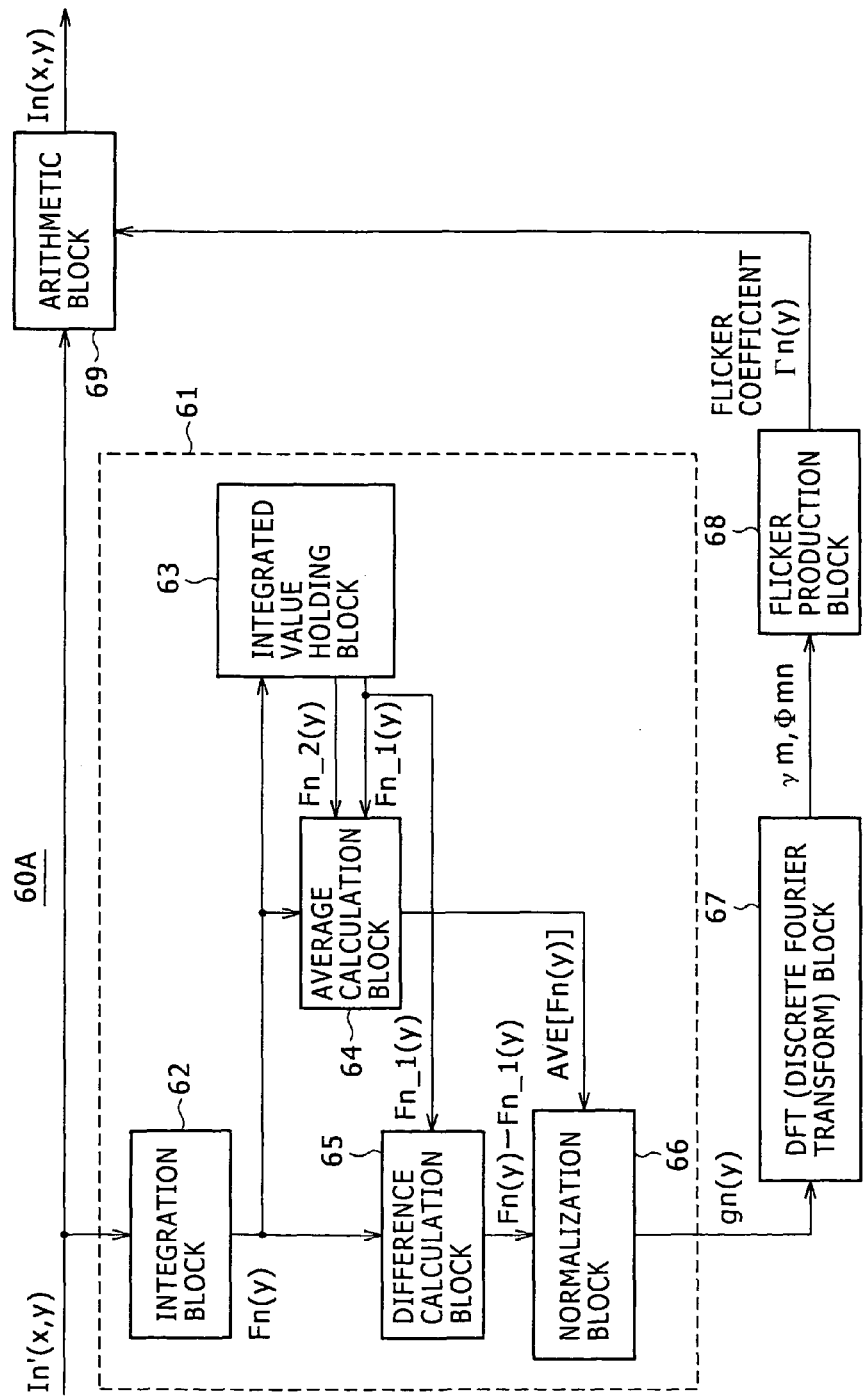
FIG. 4 is a diagram illustrating one example of a flicker detection and reduction unit.
Figure 10:
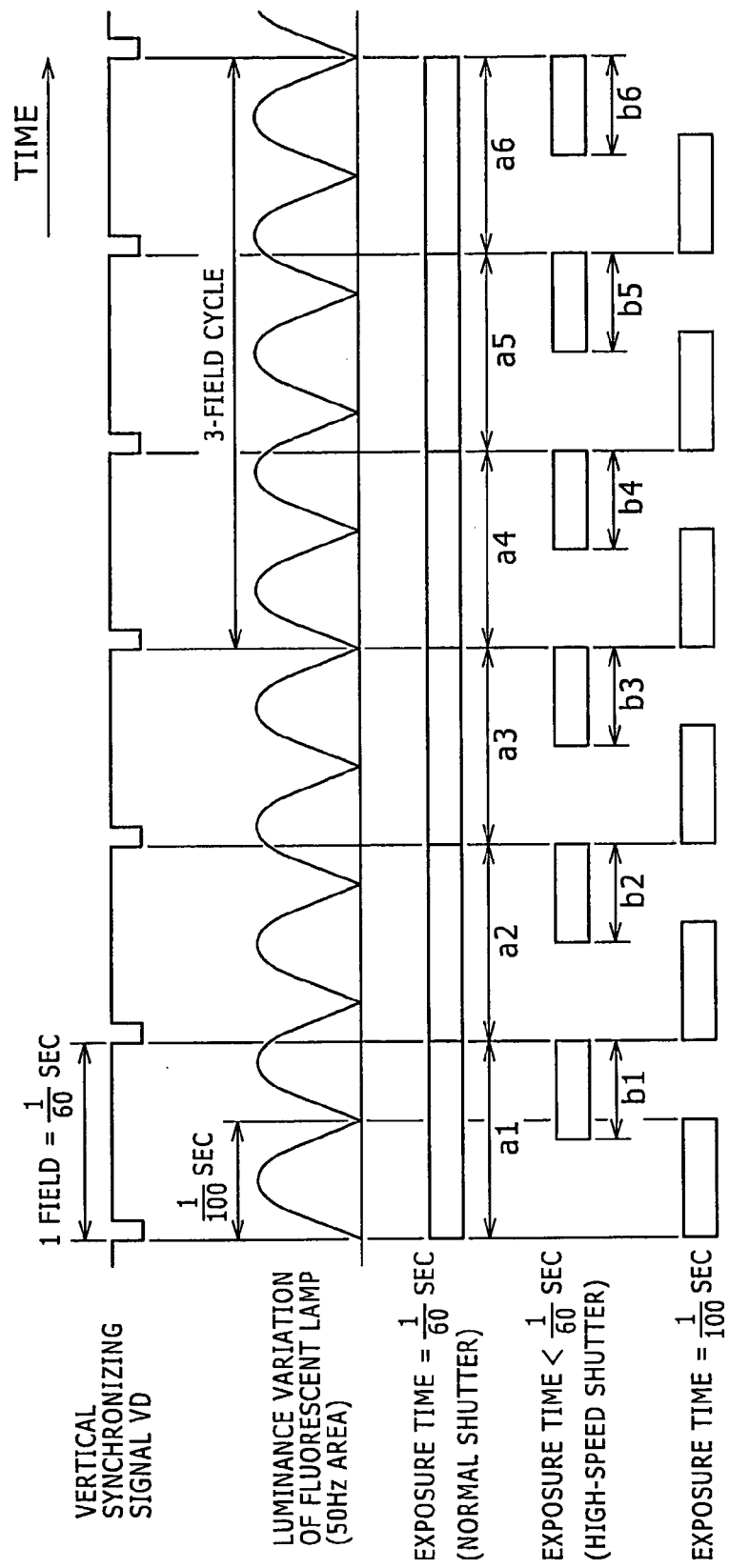
FIG. 10 is a diagram for explaining a fluorescent flicker in a CCD imaging device.
Figure 11:
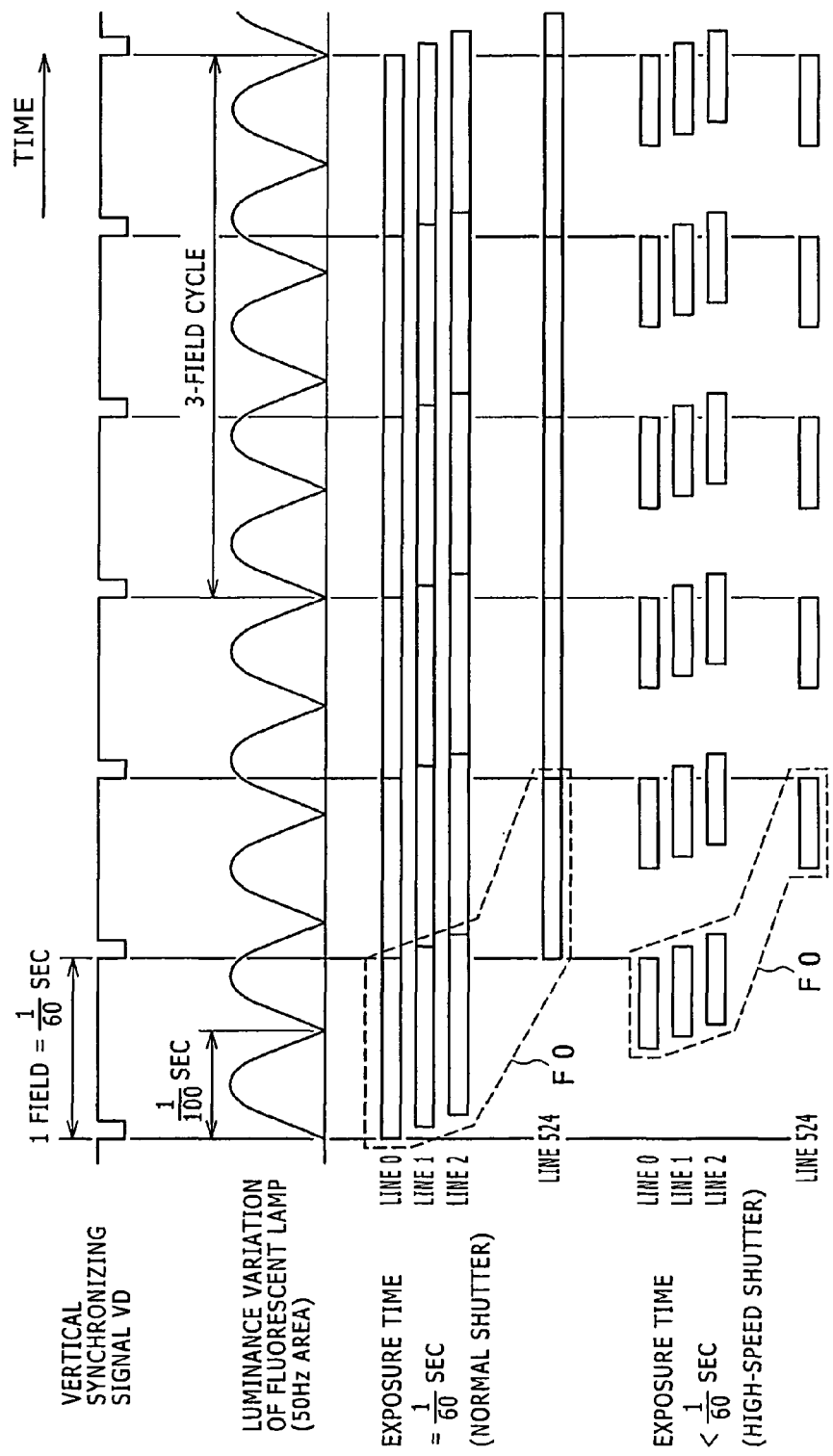
FIG. 11 is a diagram for explaining a fluorescent flicker in a CMOS imaging device.

In the flicker detection and reduction method in the invention of the prior application, if the input video signal to the flicker detection and reduction unit 60 is the RGB primary color signals like in the example of FIG. 3, a flicker detection and reduction unit 60A like one shown in FIG. 4 is provided for each of the RGB primary color signals as the flicker detection and reduction unit 60. It should be noted that the input video signal to the flicker detection and reduction unit 60 may be the complementary color signals as described above.

The example of FIG. 4 is for an NTSC (vertical synchronous frequency is 60 Hz) CMOS video camera (as described above, under a condition of illumination with a fluorescent lamp, a flicker with three-field repetition cycle and continuity on the time axis occurs when the power supply frequency is 50 Hz, while originally no flicker occurs when it is 60 Hz). Note that descriptions will be made later about a PAL (vertical synchronous frequency is 50 Hz) CMOS video camera, a CMOS video camera that is selectively set to either the NTSC or PAL system, and a progressive CMOS camera.

In the example of FIG. 4, the term "input image signal" refers to each of the RGB primary color signals that are input to the flicker detection and reduction unit 60A and have not been subjected to the flicker detection and reduction processing yet. The term "output image signal" refers to each of the RGB primary color signals that are output from the flicker detection and reduction unit 60A and have been subjected to the flicker detection and reduction processing.

Figure 12:
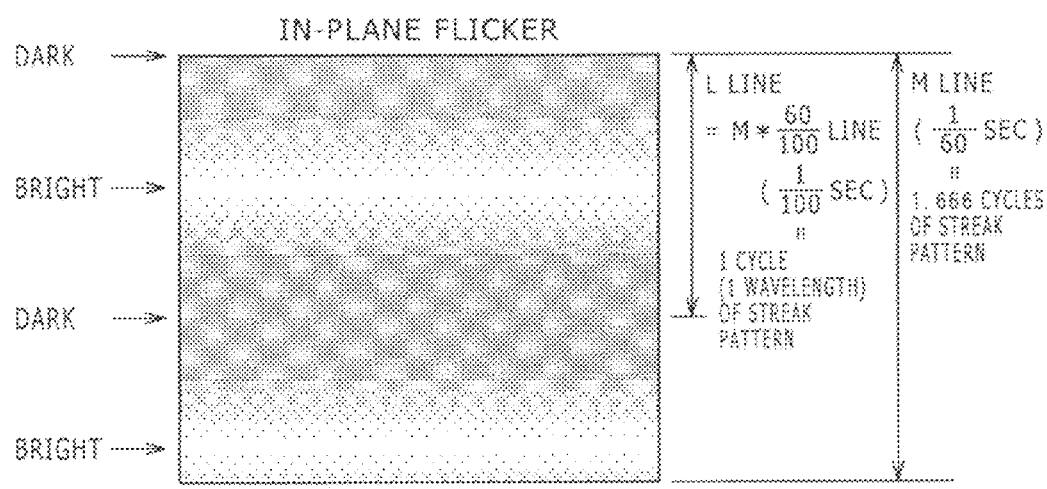
FIG. 12 is a diagram showing a streak pattern in one image plane due to a fluorescent flicker in a CMOS imaging device.
Figure 13:
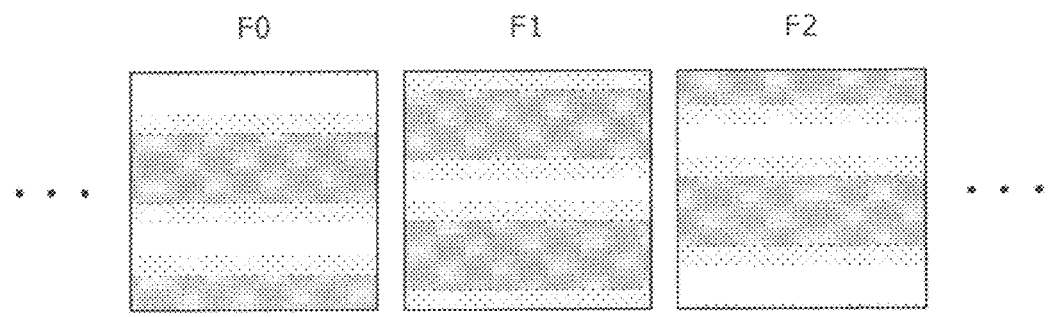
FIG. 13 is a diagram showing a streak pattern across consecutive three image planes due to a fluorescent flicker in a CMOS imaging device.

Although FIGS. 12 and 13 show an imaging target having uniformity, a flicker component is proportional to the signal intensity of an imaging target in general.

Therefore, when an input image signal of a field n and a pixel (x, y) of a general imaging target is defined as In'(x, y), the signal In'(x, y) is expressed by Equation (1) in FIG. 5 as the sum of a signal component including no flicker component and a flicker component proportional to the signal component.

In Equation (1), In(x, y) is the signal component, $\Gamma n(y)*In(x, y)$ is the flicker component, and $\Gamma n(y)$ is a flicker coefficient. One horizontal cycle is sufficiently shorter than the light-emission cycle of a fluorescent lamp ($1/100$ seconds when the power supply frequency is 50 Hz, and $1/120$ seconds when it is 60 Hz), and hence the flicker coefficient can be regarded as constant for the same line of the same field. Therefore, the flicker coefficient is expressed by $\Gamma n(y)$.

In order to generalize the flicker coefficient $\Gamma n(y)$, it is described in a format of being expanded in a Fourier series as shown in Equation (2) of FIG. 5. Thus, the flicker coefficient can be represented in a format that covers all the light-emission characteristics and afterglow characteristics, which are different depending on the kind of the fluorescent lamp.

The symbol $\lambda o$ in Equation (2) denotes the wavelength of an in-plane flicker like one shown in FIG. 13. If the number of reading-out lines per one field is defined as M and the power supply frequency is 50 Hz, the wavelength $\lambda o$ corresponds to L (=M*60/100) lines. The symbol $\omega o$ denotes a normalized angular frequency arising from normalization with the wavelength $\lambda o$.

The symbol $\gamma m$ denotes the amplitudes of the respective orders (m=1, 2, 3 . . . ) of the flicker component. The symbol Φmn denotes the initial phases of the respective orders of the flicker component, and is determined depending on the light-emission cycle of the fluorescent lamp and the exposure timing. However, if the vertical synchronous frequency is 60 Hz, the initial phase Φmn takes the same value at every three fields. Therefore, the difference of the initial phase Φmn between a field and the previous field is expressed by Equation (3) of FIG. 5.

In the example of FIG. 4, in order to reduce the influence of picture pattern of the imaging target for flicker detection, initially the input image signal In'(x, y) is integrated by an integration block 62 across one line in the horizontal direction of the image plane as shown in Equation (4) of FIG. 5 so that an integrated value Fn(y) is calculated. The symbol αn(y) in Equation (4) is the integrated value arising from integration of the signal component In(x, y) across one line as shown in Equation (5) of FIG. 5.

The calculated integrated value Fn(y) is stored and held in an integrated value holding block 63 for flicker detection of the subsequent fields. When the vertical synchronous frequency is 60 Hz, the integrated value holding block 63 is configured to be capable of holding the integrated values of at least two fields.

If the imaging target is uniform, the integrated value αn(y) of the signal component In(x, y) is a constant value, and hence it is easy to extract the flicker component αn(y)*Γn(y) from the integrated value Fn(y) of the input image signal In'(x, y).

However, in a general imaging target, the integrated value αn(y) also contains the m*ωo component. Therefore, the luminance component and color component as the flicker component cannot be separated from those as the signal component of the imaging target itself, and hence it is impossible to extract only the flicker component purely. Furthermore, since the flicker component of the second term in Equation (4) is very smaller than the signal component of the first term therein, the flicker component is almost buried in the signal component, and therefore it can be said that direct extraction of the flicker component from the integrated value Fn(y) is impossible.

For that reason, in the example of FIG. 4, the integrated values of consecutive three fields are used to remove the influence of the integrated value αn(y) from the integrated value Fn(y).

Specifically, in this example, at the time of calculation of the integrated value Fn(y), the integrated value Fn_1(y) of the same line of the field one field before the present field and the integrated value Fn_2(y) of the same line of the field two fields before the present field are retrieved from the integrated value holding block 63. Subsequently, an average calculation block 64 calculates the average value AVE[Fn(y)] of three integrated values Fn(y), Fn_1(y), and Fn_2(y).

If the imaging target can be regarded as almost invariable during the periods of the consecutive three fields, the integrated values αn(y) can be regarded as the same value. If the motion of the imaging target is sufficiently small during three fields, this assumption leads to no problem in practical use. In addition, the calculation of the average of the integrated values of the consecutive three fields is equivalent to addition of signals to each other of which flicker-component phases are shifted by $(-2\pi/3)*m$ from each other according to the relationship in Equation (3). As a result, the flicker component is cancelled. Therefore, the average value AVE[Fn(y)] is expressed by Equation (6) of FIG. 6.

The above description is for a case where the average of the integrated values of consecutive three fields is calculated based on an assumption that the approximation expressed by Equation (7) of FIG. 6 holds true. However, if the motion of the imaging target is large, the approximation of Equation (7) does not hold true.

To address this, the following operation is available as the operation in the flicker detection and reduction unit 60A that is configured also in consideration of a large motion of the imaging target. Specifically, the integrated values of three fields or more are held in the integrated value holding block 63, and the average of the integrated values of four fields or more, including the integrated value Fn(y) of the present field, is calculated. Thus, due to low-pass filter operation in the time axis direction, the influence of motion of the imaging target becomes small.

Note that since the flicker has three-field repetition cycle, there is a need to calculate the average of the integrated values of consecutive j fields (j is the value obtained by multiplying three by an integer number of at least two, i.e., j is any of 6, 9 . . . ) in order to cancel the flicker component, and the integrated value holding block 63 is configured to be capable of holding the integrated values of at least (j−1) fields.

The example of FIG. 4 corresponds to a case where the approximation of Equation (7) of FIG. 6 holds true. In this case, a difference calculation block 65 calculates the difference between the integrated value Fn(y) of the present field from the integration block 62 and the integrated value Fn_1(y) of the field one field before the present field from the integrated value holding block 63, and thus the difference value Fn(y)−Fn_1(y) expressed by Equation (8) of FIG. 6 is calculated. Equation (8) is also premised on the assumption that the approximation of Equation (7) holds true.

In the difference value Fn(y)−Fn_1(y), the influence of the imaging target has been fully removed. Therefore, the difference value Fn(y)−Fn_1(y) shows the detail of the flicker component (flicker coefficient) more clearly than the integrated value Fn(y).

In the example of FIG. 4, subsequently, in a normalization block 66, the difference value Fn(y)−Fn_1(y) from the difference calculation block 65 is divided by the average value AVE[Fn(y)] from the average calculation block 64 to thereby be normalized, and thus a normalized difference value gn(y) is calculated.

The normalized difference value gn(y) is expanded as expressed by Equation (9) of FIG. 7 in accordance with Equations (6) and (8) of FIG. 6 and a sum-to-product formula of a trigonometric function, and finally is expressed by Equation (10) of FIG. 7 according to the relationship in Equation (3) of FIG. 5. The symbols |Am| and θm in Equation (10) are expressed by Equations (11a) and (11b), respectively.

In the difference value Fn(y)−Fn_1(y), the influence of signal intensity of the imaging target remains. Accordingly, the difference value Fn(y)−Fn_1(y) involves differences of the levels of luminance variation and color variation due to a flicker dependent upon the region. In contrast, the above-described normalization allows the levels of the luminance variation and color variation due to a flicker to be adjusted to the same level across the entire region.

The symbols |Am| and θm expressed by Equations (11a) and (11b) of FIG. 7 denote the amplitudes and initial phases, respectively, of the spectra of the respective orders of the normalized difference value gn(y). If the normalized difference value gn(y) is subjected to the Fourier transform and the amplitudes |Am| and the initial phases θm of the spectra of the respective orders are detected, the amplitudes γm and the initial phases Φmn of the respective orders of the flicker component, shown in Equation (2) of FIG. 5, can be obtained in accordance with Equations (12a) and (12b) of FIG. 8.

Therefore, in the example of FIG. 4, the data corresponding to one wavelength (L lines) of the flicker in the normalized difference value gn(y) from the normalization block 66 is subjected to the discrete Fourier transform in a DFT (discrete Fourier transform) block 67.

If the DFT arithmetic operation is expressed as DFT[gn(y)] and the DFT result of the order m is defined as Gn(m), the DFT arithmetic operation is expressed by Equation (13) of FIG. 8. The symbol W in Equation (13) is expressed by Equation (14). Furthermore, according to the definition of the DFT, the relationship between Equations (11a) and (11b) and Equation (13) is expressed by Equations (15a) and (15b) of FIG. 8.

Consequently, from Equations (12a), (12b), (15a) and (15b), the amplitudes γm and the initial phases Φmn of the respective orders of the flicker component can be obtained in accordance with Equations (16a) and (16b) of FIG. 8.

The reason why the data length of the DFT arithmetic operation is set to one wavelength (L lines) of the flicker is that this data length allows direct achievement of a group of discrete spectra that are just an integral multiple of the normalized angular frequency ωo.

Although the FFT (fast Fourier transform) is used as the Fourier transform in digital signal processing in general, this example dares to employ the DFT. The reason for this is that the data length of the Fourier transform is not a power of two and hence the DFT is more convenient than the FFT. Note that it is also possible to use the FFT with input/output data being processed.

Under actual illumination with a fluorescent lamp, a flicker component can be sufficiently approximated even when the number of the orders m is limited within several orders, and hence there is no need to output all data in the DFT arithmetic operation. Therefore, the DFT involves no disadvantage compared with the FET in terms of the calculation efficiency.

In the DFT block 67, initially spectra are extracted through the DFT arithmetic operation defined by Equation (13), followed by estimation of the amplitudes γm and the initial phases Φmn of the respective orders of the flicker component through calculation in accordance with Equations (16a) and (16b).

In the example of FIG. 4, subsequently, a flicker production block 68 calculates the flicker coefficient Γn(y) expressed by Equation (2) of FIG. 5 from the estimated values of the amplitudes γm and the initial phases Φmn from the DFT block 67.

As described above, under actual illumination with a fluorescent lamp, a flicker component can be sufficiently approximated even when the number of the orders m is limited within several orders. Therefore, in the calculation of the flicker coefficient Γn(y) based on Equation (2), the total orders do not need to be the infinite but can be limited within orders up to a predefined order, e.g. within the orders up to the second order.

According to the above-described method, even for a region such as a black background part and a low-illuminance part in which the flicker component is so small that the flicker component is completely buried in the signal component in the integrated value Fn(y), the flicker component can be detected with high accuracy by calculating the difference value Fn(y)−Fn_1(y) and normalizing the difference value with the average value AVE[Fn(y)].

The estimation of the flicker component from spectra up to an adequate order is equivalent to an approximation without complete reproduction of the normalized difference value gn(y). However, due to such an approximation, even when a discontinuous part arises in the normalized difference value gn(y) depending on the condition of the imaging target, the flicker component of the discontinuous part can be estimated accurately after all.

From Equation (1) of FIG. 5, the signal component In(x, y), which does not include the flicker component, is expressed by Equation (17) of FIG. 8.

In the example of FIG. 4, therefore, in an arithmetic block 69, one is added to the flicker coefficient Γn(y) from the flicker production block 68, and then the input image signal In'(x, y) is divided by the sum [1+Γn(y)].

This arithmetic operation results in almost complete elimination of the flicker component included in the input image signal In'(x, y), so that the signal component In(x, y) that does not substantially include the flicker component is obtained as an output image signal from the arithmetic block 69.

If all the above-described processes cannot be completed within a time period of one field due to restriction of the arithmetic capability of the system, the following configuration is also available. Specifically, by use of the characteristic that the same flicker pattern is repeated in every three fields, a function of holding the flicker coefficients Γn(y) across three fields is provided in the arithmetic block 69 so that the held flicker coefficient Γn(y) is subjected to arithmetic operation of the input image signal In'(x, y) of the field three fields after the present field.

In the example of FIG. 4, the integrated value Fn(y) is not normalized unlike another configuration example to be described later but the difference value Fn(y)−Fn_1(y) is normalized with the average value AVE[Fn(y)]. However, for convenience, the previous part of the DFT block 67 in the flicker detection and reduction unit 60A is referred to as a normalized integrated value calculation block 61.

(Another Configuration Example of Flicker Detection and Reduction Unit)

If the difference value Fn(y)−Fn_1(y) is normalized with the average value AVE[Fn(y)] like in the example of FIG. 4, a finite calculation accuracy can be assured effectively. However, as long as a required calculation accuracy can be satisfied, the integrated value Fn(y) from the integration block 62 may be directly normalized with the average value AVE[Fn(y)].

In this case, however, the normalized difference value gn(y) is expressed by Equation (18) of FIG. 9. Therefore, in order to execute processing in the subsequent stages similarly to the example of FIG. 4, one is subtracted from the normalized difference value gn(y) expressed by Equation (18) as shown in Equation (19) of FIG. 9, and the subtraction result is transmitted to the DFT block 67.

In this case, the relationships |Am|=γm and θm=Φmn are satisfied. Therefore, from Equations (15a) and (15b) of FIG. 8, the amplitudes γm and the initial phases Φmn can be obtained in accordance with Equations (20a) and (20b) of FIG. 9.

In the example of FIG. 4, the DFT block 67 extracts spectra through the DFT arithmetic operation defined by Equation (13) of FIG. 8, and then estimates the amplitudes γm and the initial phases Φmn of the respective orders of the flicker component through arithmetic operation of Equations (16a) and (16b). On the contrary, in this another configuration example, the DFT block 67 extracts spectra through the DFT arithmetic operation defined by Equation (13), and then estimates the amplitudes γm and the initial phases Φmn of the respective orders of the flicker component through arithmetic operation of Equations (20a) and (20b). The subsequent processing is the same as that in the example of FIG. 4.

In this another configuration example, there is no need to provide the difference calculation block 65, and correspondingly the flicker detection and reduction unit 60A can be simplified.

In the example of FIG. 4, if the approximation of Equation (7) of FIG. 6 holds true, the average value AVE[Fn(y)] used for the normalization of the difference value $Fn(y) \pm Fn\_1(y)$ is equal to the integrated value $\alpha n(y)$ as shown in Equation (6). Furthermore, since the second term $[\alpha n(y) * \Gamma n(y)]$ in Equation (4) of FIG. 5 is sufficiently smaller than the first term $\alpha n(y)$, the influence of the second term on normalization is very small.

Therefore, even if the integrated value Fn(y) from the integration block 62 is used instead of the average value AVE[Fn(y)] for the normalization of the difference value $Fn(y)-Fn\_1(y)$, almost no problem is found, and the flicker component can be detected effectively similarly to the case of using the average value AVE[Fn(y)].

If the integrated value Fn(y) is used, it is sufficient for the integrated value holding block 63 to be capable of holding the integrated value of only one field, and the average calculation block 64 is unnecessary. Therefore, the flicker detection and reduction unit 60A can be simplified.

In the above-described examples, the input image signal In'(x, y) is integrated across one line. However, since the integration of the input image signal In'(x, y) is in order to obtain the sampling values of the flicker component with the influence of picture pattern of the imaging target being reduced, the number of the lines of the integration is not limited to one but the integration may be implemented across plural lines.

When the vertical synchronous frequency is 60 Hz and the power supply frequency is 50 Hz, one cycle of a fluorescent flicker, which appears as a streak pattern on the image plane, is equivalent to L (=M*60/100) lines as described above. Therefore, if at least two sampling values are obtained within the one cycle, i.e., in the L lines, so-called sampling theory allows the detection of the flicker component.

In actuality, it is desirable to obtain at least several or at least ten sampling values within one cycle of the flicker. Even in this case, the input image signal In'(x, y) can be integrated across a time period of at least several times or at least ten times the horizontal cycle. The integration time period may not be just an integer multiple of the horizontal cycle. Specifically, it may be e.g. 2.5 horizontal cycles.

This extension of the integration time period and reduction in the number of sampling times per unit time can decrease the burden of the DFT arithmetic operation in the DFT block 67, and can reduce the influence of a movement of the imaging target in the vertical direction of the image plane.

In the above-described examples, when the level of the input image signal In'(x, y) is in the saturation region, the execution of the arithmetic operation of Equation (17) of FIG. 8 in the arithmetic block 69 adversely results in a change of the signal component (primary color signal component, in the above-described examples).

To address this, it is desirable that the arithmetic block 69 be configured to operate as follows. Specifically, the arithmetic block 69 determines for each pixel whether or not the level of the input image signal In'(x, y) is equal to or higher than the threshold level of the saturation region. Subsequently, for the pixel of which input image signal In'(x, y) has a level lower than the threshold level of the saturation region, the arithmetic block 69 outputs the arithmetic result of Equation (17) of FIG. 8 as the output image signal In(x, y) as described above. In contrast, for the pixel of which input image signal In'(x, y) has a level equal to or higher than the threshold level of the saturation region, the arithmetic block 69 outputs the input image signal In'(x, y) directly as the output image signal In(x, y).

Due to this operation, a change of a signal component when the level of the input image signal In'(x, y) is in the saturation region can be avoided, which allows achievement of an output image signal of a high image quality.

(Outside Imaging and Imaging Under Illumination without Fluorescent Lamp)

In outdoor imaging and imaging under illumination without a fluorescent lamp, originally the flicker detection and reduction processing is unnecessary.

Furthermore, when a still image is to be captured by use of a video camera that can capture both moving images and still images, the exposure timings (exposure-start and exposure-end timings) of all the pixels in one image plane can be set to the same timing even if the video camera is a CMOS imaging device. Therefore, the occurrence of the fluorescent flicker can be avoided, which eliminates the need to execute the flicker detection and reduction processing. In this case, there is no restriction on the electronic shutter speed unlike in imaging of a moving image. Consequently, video signals can be read out from the CMOS imaging element slowly, with the mechanical shutter being closed to ensure light shielding.

If the flicker detection and reduction processing is unnecessary like in these cases, the flicker detection and reduction unit 60 (60A) is controlled by the system controller 80 so as not to execute the flicker detection and reduction processing but the input image signal In'(x, y) is output directly as the output image signal In(x, y).

(Pal System and Progressive System)

The above-described examples correspond to an NTSC (vertical synchronous frequency is 60 Hz) CMOS video camera. As for a PAL (vertical synchronous frequency is 50 Hz) CMOS video camera, when the camera is operated under illumination with a fluorescent lamp and the power supply frequency is 60 Hz, a flicker having a five-field (five-image plane) repetition cycle and continuity on the time axis occurs. Therefore, the flicker detection and reduction unit 60 (60A) is provided with a configuration to address this flicker (configuration in which "three-field" in the example of the NTSC system is replaced by "five-field").

In a CMOS video camera that is selectively set to either the NTSC or PAL system, the flicker detection and reduction unit 60 is configured to operate as follows. Specifically, when the camera is set to the NTSC system, the flicker detection and reduction unit 60 is also switched to the unit for the NTSC system. In contrast, when the camera is set to the PAL system, the flicker detection and reduction unit 60 is also switched to the unit for the PAL system.

In addition, as for e.g. a progressive CMOS camera having a vertical synchronous frequency of 30 Hz (frame frequency of 30 Hz), when the camera is operated under illumination with a fluorescent lamp and the power supply frequency is 50 Hz, a flicker having a three-frame (three-image plane) repetition cycle and continuity on the time axis occurs. Therefore, the flicker detection and reduction unit 60 (60A) is provided with a configuration to address this flicker (configuration in which "field" and "three-field" in the example of the NTSC system are replaced by "frame" and "three-frame", respectively).

OTHER EMBODIMENTS

In the above-described examples, the digital signal processor 40 including the flicker detection and reduction unit 60 is configured by hardware. However, the flicker detection and reduction unit 60 or part or all of the digital signal processor 40 may be configured by software.

Furthermore, the invention can be applied also to an imaging device that employs an XY-address scanning-type imaging element other than a CMOS imaging element.

INDUSTRIAL APPLICABILITY

As described above, according to the invention, a fluorescent flicker can be detected correctly and accurately, and hence a fluorescent flicker component can be reduced surely and sufficiently.

The invention claimed is:

1. A signal processing method for processing a video signal obtained through imaging of an imaging target by an XY-address scanning-type imaging element, the method comprising:
    correcting an inter-channel gain among a plurality of reading-out channels of a video signal arising from analog-to-digital conversion of the video signal to produce a corrected video signal; and
    detecting a fluorescent flicker component from the corrected video signal and reducing the fluorescent flicker component, after correcting the inter-channel gain.

2. The signal processing method according to claim 1, wherein
    producing the corrected video signal comprises processing of equalizing signal gains of the plurality of reading-out channels is executed if a video signal is read out through the plurality of reading-out channels from the imaging element.

3. The signal processing method according to claim 1, further comprising processing of reducing fixed pattern noise of the imaging element is executed to produce the corrected video signal.

4. The signal processing method according to claim 1, further comprising processing of correcting data of a defective pixel in the imaging element is executed to produce the corrected video signal.

5. The signal processing method according to claim 1, further comprising noise reduction processing is executed to produce the corrected video signal.

6. The signal processing method according to claim 1, further comprising processing of correcting lens shading is executed to produce the corrected video signal.

7. The signal processing method according to any of claims 1 to 6, wherein
    after the flicker detection and reduction, white balance adjustment is executed for a video signal in which a flicker has been reduced.

8. The signal processing method according to any of claims 1 to 6, wherein
    after the flicker detection and reduction, a defective pixel in the imaging element is detected from a video signal in which a flicker has been reduced.

9. An imaging device including an XY-address scanning-type imaging element, the device comprising:
    conversion means for analog-to-digital converting a video signal obtained through imaging of an imaging target by the imaging element to produce a converted video signal;
    correction means for correcting an inter-channel gain among reading-out channels of the converted video signal to produce a corrected video signal; and
    flicker detection and reduction means for detecting a fluorescent flicker component from the corrected video signal and reducing the fluorescent flicker component.

10. An imaging device including an XY-address scanning-type imaging element, the device comprising:
    a converter that analog-to-digital converts a video signal obtained through imaging of an imaging target by the imaging element to produce a converted video signal;
    a corrector that corrects an inter-channel gain among reading-out channels of the converted video signal to produce a corrected video signal; and
    a flicker detection and reduction unit that detects a fluorescent flicker component from the corrected video signal and reduces the fluorescent flicker component.

* * * * *